United States Patent
Widdowson et al.

(10) Patent No.: US 9,684,072 B2
(45) Date of Patent: Jun. 20, 2017

(54) RANGE DETERMINATION APPARATUS AND METHOD

(75) Inventors: Paul Widdowson, Whitley (GB); Mark Cund, Whitley (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 701 days.

(21) Appl. No.: 13/823,262

(22) PCT Filed: Sep. 16, 2011

(86) PCT No.: PCT/EP2011/066096
§ 371 (c)(1),
(2), (4) Date: Sep. 20, 2013

(87) PCT Pub. No.: WO2012/035138
PCT Pub. Date: Mar. 22, 2012

(65) Prior Publication Data
US 2014/0002294 A1    Jan. 2, 2014

(30) Foreign Application Priority Data

Sep. 16, 2010 (GB) .................................. 1015509.1

(51) Int. Cl.
*G01S 13/93* (2006.01)
*G01S 7/40* (2006.01)
(Continued)

(52) U.S. Cl.
CPC .............. *G01S 13/931* (2013.01); *G01S 7/40* (2013.01); *G01S 7/4052* (2013.01);
(Continued)

(58) Field of Classification Search
CPC ................. G01S 13/931; G01S 15/931; G01S 2013/9325; G01S 7/4052; G01S 13/582;
(Continued)

(56) References Cited

U.S. PATENT DOCUMENTS 6,023,237 A   2/2000   Kunert
6,121,915 A   9/2000   Cooper et al.
(Continued)

FOREIGN PATENT DOCUMENTS

CN   101236253 A   8/2008
JP   H09207610 A   8/1997
(Continued)

OTHER PUBLICATIONS

Search Report under Section 17(5) for Application No. GB1015509.1, dated Jun. 15, 2011.
(Continued)

*Primary Examiner* — Matthew M Barker
(74) *Attorney, Agent, or Firm* — Carlson, Gaskey & Olds

(57) ABSTRACT

Embodiments of the invention provide apparatus (100) for detecting an erroneous measurement of a range of a target object 20 from a subject object 5. A transmitter transmits a signal (111S) having a first frequency from the subject object (5) to the target object (20). A detector (113) detects a portion of the signal (113S) reflected from the target object (20) back to the subject object (5); a controller is configured to determine the range (202) of the target object (20) from the subject object (5) by reference to a time of flight of the portion of the signal (111S), (113S) from the transmitter (111) to the detector (113); determine the rate of change of the range (203) by reference to a difference between the first frequency and an apparent frequency of the reflected portion of the signal (113S) detected by the detector; and provide an indication (206) that an erroneous measurement of range has been made if the range (202) increases while the rate of change of range (203) is negative.

21 Claims, 6 Drawing Sheets

(51) Int. Cl.
*G01S 7/52* (2006.01)
*G01S 13/58* (2006.01)
*G01S 15/58* (2006.01)
*G01S 15/93* (2006.01)

(52) U.S. Cl.
CPC ........ *G01S 7/52004* (2013.01); *G01S 13/582* (2013.01); *G01S 13/584* (2013.01); *G01S 15/582* (2013.01); *G01S 15/586* (2013.01); *G01S 15/931* (2013.01); *G01S 2007/4082* (2013.01); *G01S 2013/9325* (2013.01); *G01S 2013/9346* (2013.01); *G01S 2013/9375* (2013.01); *G01S 2013/9389* (2013.01); *G01S 2015/938* (2013.01)

(58) Field of Classification Search
CPC .... G01S 15/586; G01S 13/584; G01S 15/582; G01S 7/40; G01S 7/52004; G01S 2013/9346; G01S 2007/4082; G01S 2013/9389; G01S 2015/938; G01S 2013/9375
See application file for complete search history.

(56) References Cited

U.S. PATENT DOCUMENTS

| | | | |
|---|---|---|---|
| 6,121,919 A | * | 9/2000 | Ameen ................ G01S 7/4021 342/174 |
| 6,384,768 B1 | | 5/2002 | Kai |
| 7,457,699 B2 | * | 11/2008 | Chia ................ B60K 31/0008 701/301 |
| 2005/0159875 A1 | | 7/2005 | Chia |

FOREIGN PATENT DOCUMENTS

| | | | |
|---|---|---|---|
| JP | 2000510238 A | | 8/2000 |
| JP | 2002082164 A | * | 3/2002 |
| JP | 2006276023 A | | 10/2006 |
| WO | 2010009919 A1 | | 1/2010 |

OTHER PUBLICATIONS

International Search Report for International application No. PCT/EP2011/066096 dated Nov. 29, 2011.

* cited by examiner (a)

(b)

RANGE DETERMINATION APPARATUS AND METHOD

FIELD OF THE INVENTION

This disclosure relates to apparatus and a method for determining a range of one object from another object. In particular but not exclusively the disclosure relates to a method and apparatus capable of detecting a correct value of the range of one object from the other object in circumstances where known devices may provide an erroneous range value.

BACKGROUND

It is known to provide apparatus for determining the range of one object such as a motor vehicle from another object such as another motor vehicle or a fixed object such as a wall of a building. One form of known apparatus employs ultrasonic radiation to determine the range whilst another form of apparatus employs electromagnetic radiation using a technique known as RADAR (RAdio Detection And Ranging).

In one arrangement a source of ultrasonic radiation is mounted to a bumper (or fender) of a vehicle together with a corresponding detector. The source is arranged to transmit an ultrasonic radiation signal away from the vehicle, the detector being arranged to detect a portion of the ultrasonic radiation signal reflected by an object back towards the vehicle. A controller is arranged to determine a length of time between transmission of the signal and detection of the reflected signal.

It is to be understood that knowledge of the speed at which the signal travels between the vehicle and the reflecting object may be used to determine a distance of the vehicle from the object. In some arrangements a controller may be configured to sound an alarm or apply a brake of the vehicle in the event that a distance of the vehicle from the object becomes less than a prescribed value.

The present inventors have recognized that a problem exists with known apparatus in that erroneous readings of range can be given in certain situations. This is because the position on the object from which the transmitted signal is reflected can change as the vehicle approaches the object.

FIG. 1 illustrates a scenario in which such a change in the position of reflection occurs. In FIG. 1(a) a motor car 5 is shown approaching a lorry 20. A transducer device 10 arranged to transmit an ultrasonic radiation signal 11 ahead of the car 5 is installed in a front bumper 7 of the car 5. The device 10 is also arranged to detect a reflected portion 13 of the transmitted signal 11.

It can be seen from FIG. 1(a) that when the car 5 is relatively far from the lorry 20 the signal is reflected from a rear door surface 22 of the lorry 20. However, as shown in FIG. 1(b), when the car 5 is relatively close to the lorry 20 the signal is no longer reflected from the rear surface 22 but from a rear axle 24 of the lorry 20. The rear axle 24 is further from the car 5 than the rear door surface 22 by a distance d, introducing an error into the measured distance of the car 5 from the lorry 20 corresponding to the distance d. Thus, in the situation illustrated in FIG. 1(b) a controller of the car 5 may fail to warn a driver of the car 5 that a distance between the car 5 and the lorry 20 is dangerously low and that a risk of collision exists.

It is an aim of embodiments of the present invention to at least partially mitigate the disadvantages of known range determination apparatus. Other aims and advantages of the invention will become apparent from the following description, claims and drawings.

SUMMARY

According to an example embodiment, there is provided an apparatus for detecting an erroneous measurement of a range of a target object from a subject object comprising:
wireless transmission means for transmitting a signal having a first frequency from the subject object to the target object;
detector means for detecting a portion of the signal reflected from the target object back to the subject object;
range determination means for determining the range of the target object from the subject object by reference to a time of flight of said portion of the signal from the transmission means to the detector means; and
rate determination means for determining the rate of change of the range by reference to a difference between the first frequency and an apparent frequency of the reflected portion of the signal detected by the detector means,
the apparatus being arranged to estimate that an erroneous measurement of range has been made in by means of a comparison between the range determined by the range determination means and the rate of change of range determined by the rate determination means.

In an embodiment, the range determination means may be arranged to determine the range of the target object from the subject object by reference to a time of flight of the portion of the signal from the transmission means to the detector means.

In an embodiment, the rate determination means may be arranged to determine the rate of change of the range by reference to a difference between the first frequency and an apparent frequency of the reflected portion of the signal detected by the detector means.

In an embodiment, the apparatus is arranged to provide an indication that an erroneous measurement of range has been made if the range determined by the range determination means increases whilst the rate of change of range determined by the rate determination means is negative.

It is to be understood that the apparent change in frequency of the reflected radiation signal relative to the transmitted signal as determined by the apparatus is due to the well-known Doppler effect. The change in frequency is independent of the position on the object from which the transmitted signal is reflected and may therefore serve as a reliable indicator that an erroneous range measurement is being made.

The apparatus may be arranged to provide an indication that an erroneous determination of range has been made only if the further requirement is met that the range determination means determines that the measured range of the target object represents an increase over a preceding measurement each time a measurement of range has been made for the previous n measurements where n is an integer greater than or equal to 1.

The preceding measurement may be an immediately preceding measurement.

The apparatus may be further arranged to provide an indication that an erroneous determination of range has been made only if further requirement is met that the rate determination means determines that the rate of change of range of the target object has been negative each time a measurement of range has been made for the previous m measurements where m is an integer greater than or equal to 1.

In one example m=n.

The indication that an erroneous measurement of range has been made is preferably provided in the form of an alert to a user of the apparatus.

The alert may be provided by one selected from amongst an audible alert, a visual alert and a physical alert.

The apparatus may further comprise range correction means arranged to correct the value of range determined by the range determination means when an erroneous measurement of range is detected based on at least one selected from amongst the rate of change of range determined by the rate determination means and the range determined by the range determination means.

The range correction means may be arranged to correct the value of range based on an integral of values of the rate of change of range determined by the rate determination means.

The range correction means may be arranged to correct a last known correct value of range by adding the integral of the values of the rate of change to the last known correct value of range.

The range correction means may be arranged to correct the value of range based on an integral of values of the rate of change of range determined by the rate determination means.

The wireless transmission means may comprise means for transmitting electromagnetic radiation and the detector means comprises means for detecting electromagnetic radiation.

The wireless transmission means may comprise a radar transmitter.

Alternatively or in addition the wireless transmission means may comprise means for transmitting sonic radiation and the detector means may comprise means for detecting sonic radiation.

Alternatively or in addition the wireless transmission means may comprise means for transmitting ultrasonic radiation and the detector means may comprise means for detecting ultrasonic radiation.

According to an example embodiment, there is provided a motor vehicle having apparatus as claimed in any preceding claim installed therein.

The apparatus may be arranged to trigger one selected from amongst an audible alert, a visual alert, a physical alert and application of a brake when the range of the target object from the subject object being the motor vehicle falls below a prescribed threshold.

According to an example embodiment, there is provided a method of detecting an erroneous measurement of a range of a target object from a subject object comprising:
  transmitting a signal having a first frequency from the subject object to the target object;
  detecting a portion of the signal reflected from the target object back to the subject object;
  determining a range of the target object from the subject object; determining the rate of change of the range; and
  providing an indication that an erroneous measurement of range has been made if the determined range increases whilst the determined rate of change of range is negative.

In an embodiment, the method comprises:
  transmitting by means of a transmitter a signal having a first frequency from the subject object to the target object;
  detecting by means of a detector a portion of the signal reflected from the target object back to the subject object;
  determining by range determination means a range of the target object from the subject object, for example by reference to a time of flight of said portion of the signal from the transmission means to the detector means; and
  determining by rate determination means the rate of change of the range, for example by reference to a difference between the first frequency and the apparent frequency of the reflected portion of the signal detected by the detector means; and
  providing an indication that an erroneous measurement of range has been made if the determined range increases whilst the determined rate of change of range is negative.

The step of providing an indication that an erroneous determination of range has been made may further comprise providing said indication only if the range determination means determines that the measured range of the target object represents an increase over a preceding measurement each time a measurement of range has been made for the previous n measurements where n is an integer greater than or equal to 1 whilst the determined rate of change of range is negative.

The preceding measurement may be an immediately preceding measurement.

The step of providing an indication that an erroneous determination of range has been made may further comprise providing said indication only if the further requirement is met that the rate determination means determines that the rate of change of range of the target object has been negative each time a measurement of range has been made for the previous m measurements where m is an integer greater than or equal to 1.

The step of providing an indication that an erroneous measurement of range has been made may comprise providing an alert to a user of the apparatus.

The step of providing an alert may comprise the step of providing one selected from amongst an audible alert, a visual alert and a physical alert.

The method may further comprise the step of providing a corrected value of range when it is detected that an erroneous measurement of range has been made based on at least one selected from amongst the rate of change of range determined by the rate determination means and the range determined by the range determination means.

The step of providing a corrected value of range may comprise the step of correcting the value of range based on an integral of values of the rate of change of range determined by the rate determination means.

The step of providing a corrected value of range may comprise the step of correcting a last known correct value of range by adding the integral of the values of the rate of change of range to the last known correct value of range.

The signal transmitted by the transmitter may be an electromagnetic signal.

The signal transmitted by the transmitter may be a radar signal.

Alternatively or in addition the signal transmitted by the transmitter may be a sonic radiation signal.

Alternatively or in addition the signal transmitted by the transmitter may be an ultrasonic radiation signal.

According to an example embodiment, there is provided a method of detecting an erroneous measurement of a range of a target object from a subject object comprising:

transmitting by means of a transmitter a signal having a first frequency from the subject object to the target object;

detecting at the subject object by means of a detector a portion of the signal reflected from the target object back to the subject object;

determining a range of the target object from the subject object by reference to a time of flight of said portion of the signal from the transmission means to the detector means; and determining the rate of change of the range by reference to a difference between the first frequency and the apparent frequency of the reflected portion of the signal detected by the detector means; and providing an indication that an erroneous measurement of range has been made if the determined range increases whilst the determined rate of change of range is negative.

Within the scope of this application it is envisaged that the various aspects, embodiments, examples, features and alternatives set out in the preceding paragraphs, in the claims and/or in the following description and drawings may be taken independently or in any combination thereof, except where there is incompatibility of features.

BRIEF DESCRIPTION OF THE DRAWINGS

Example embodiments will now be described, by way of example only, with reference to the accompanying figures in which.

DETAILED DESCRIPTION

In at least one disclosed embodiment apparatus is provided that is configured to determine a range of one object from another object and to determine whether the determined value is an erroneous value. If the apparatus determines that the determined value is an erroneous value the apparatus is configured to correct the determined value.

Figure 2:
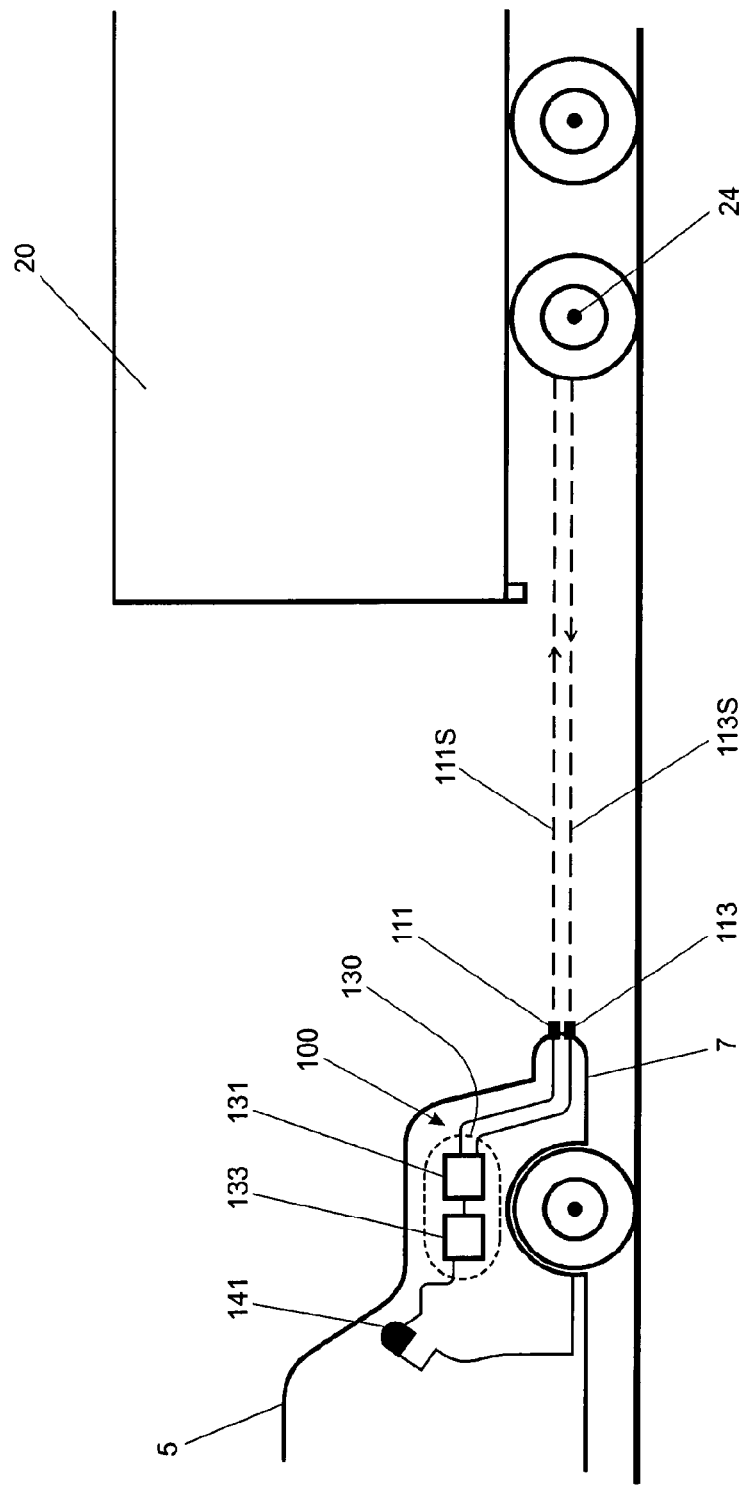
FIG. 2 is a schematic illustration of a trajectory of a beam of electromagnetic radiation transmitted from a motor car according to an embodiment of the invention showing reflection of the beam from a rear axle of the lorry when the car is a relatively short distance from the lorry.

FIG. 2 shows apparatus 100 according to an embodiment installed in a motor car 5. The apparatus has a radar transmitter 111 and a corresponding receiver 113. The transmitter 111 is arranged to emit a radar (electromagnetic radiation) signal 111S in a direction away from the car 5 whilst the receiver 113 is arranged to detect a portion 113S of the signal 111S reflected by an object 20 back towards the car 5. In the situation illustrated in FIG. 2 the signal 113S has been reflected by a rear axle 24 of a lorry 20.

In some embodiments the radar signal 111S is in the form of an intermittent (pulsed) signal. In some alternative embodiments the signal 111S is a modulated continuous wave signal. In some embodiments the pulsed signal comprises a modulated continuous wave signal.

The apparatus 100 has a controller 130 having a detector module 131 and a control module 133. The detector module 131 is arranged to determine the range of a reflecting (target) object 24 from the apparatus 100 at a given moment in time and the rate of change of the range.

The detector module 131 is configured to determine the range based on a time of flight measurement of the portion 113S of the signal 111S emitted by the transmitter 111 and received by the receiver 113 following reflection from the target object 24. A reflecting target object 24 may be referred to herein as a 'target' 24.

It is to be understood that a radar signal emitted by the transmitter 111 may be reflected by a plurality of objects 24. The detector module 131 is arranged to identify each of the objects as discrete targets 24 and to track the positions of each of these targets 24 as a function of time. In the present embodiment the detector module 131 is arranged to assign a unique identification code to each target 24.

The detector module 131 is further configured to determine a rate of change of the range of each target 24 from the apparatus 100 by measuring a difference between the frequency of the signal 111S emitted by the transmitter 111 and the apparent frequency of the reflected signal 113S detected by the receiver 113.

The apparent difference in frequency between these signals 111S, 113S is due to the well-known Doppler effect. If range of the target 24 from the vehicle 5 is increasing the reflected signal will have an apparent frequency that is less than that of the transmitted signal 111S. Conversely, if the range of the target 24 from the vehicle 5 is decreasing the reflected signal will have an apparent frequency that is greater than that of the transmitted signal 111S. It is to be understood that measurement of range and rate of change of range as described above are well known in the art.

The detector module 131 is arranged to output data in respect of each target 24 identified by the detector module 131 to a control module 133. The data includes: (i) the unique identifier assigned to each target 24 by the detector module 131, being given by a parameter 'Target Id' 201; the range of each target 24 from the apparatus 100, being given by a parameter 'Range' 202; and the rate of change of the range, being given by a parameter 'Range rate' 203.

Figure 3:
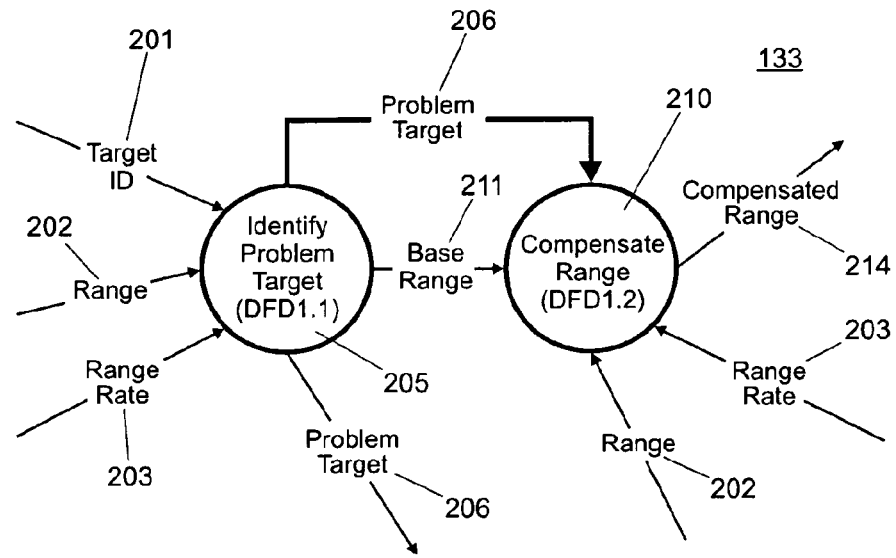
FIG. 3 illustrates the functionality of a control module of the apparatus.

FIG. 3 is a schematic diagram showing the functionality of the control module 133. As shown, values of the parameters Target Id 201, Range 202 and Range rate 203 are input to a function block 205 referred to herein as an 'Identify Problem Target' function block 205. It is to be understood that this function block and other function blocks described herein may be implemented in software, firmware and/or hardware. In the present embodiment the functionality of the control module 133 is implemented in software by a microprocessor system.

The Identify Problem Target function block 205 is arranged to identify a target 24 as a problem target if the value of the parameter Range 202 increases whilst the value of the parameter Range rate 203 is negative. It is to be understood that a situation in which the value of Range 202 increases whilst the value of Range rate 203 is negative is not rational. This is because if the value of the parameter Range 202 is increasing it is indicative of a situation in which the value of the parameter Range rate 203 should be positive. This is because the range of the target 24 from the apparatus 100 is increasing and not decreasing according to the detected change in the value of parameter Range 202.

In this embodiment the smallest increase in the parameter Range 202 identifiable by the Identify Target function block 205 is 0.1 m, however this can be altered by a calibrateable constant.

If such a situation occurs, the Identify Problem Target function block 205 sets a 'Problem Target' flag 206 associated with the Target Id parameter 201 to a value of 1. Thus, the apparatus assumes that the discrepancy between the change in the value of the parameter Range 202 and the value of the parameter Range rate 203 are due to a change in position on the target object from which the radar signal is being reflected.

If the above conditions are not met, and a target is not identified as a problem target, the Problem Target flag 206 remains set to a value of zero.

The value of the Problem Target flag 206 is provided as an input to a Compensate Range function block 210 of the apparatus (see also FIG. 3). The Compensate Range function block 210 is arranged to determine a true value of the range of the apparatus 100 from the target 24 by correcting the measured value of range based on the value of the parameters Range 202 and Range rate 203. Thus, the values of the parameters Range 202 and Range rate 203 are also provided as inputs to the Compensate Range function block 210 as illustrated in FIG. 3.

Figure 4:
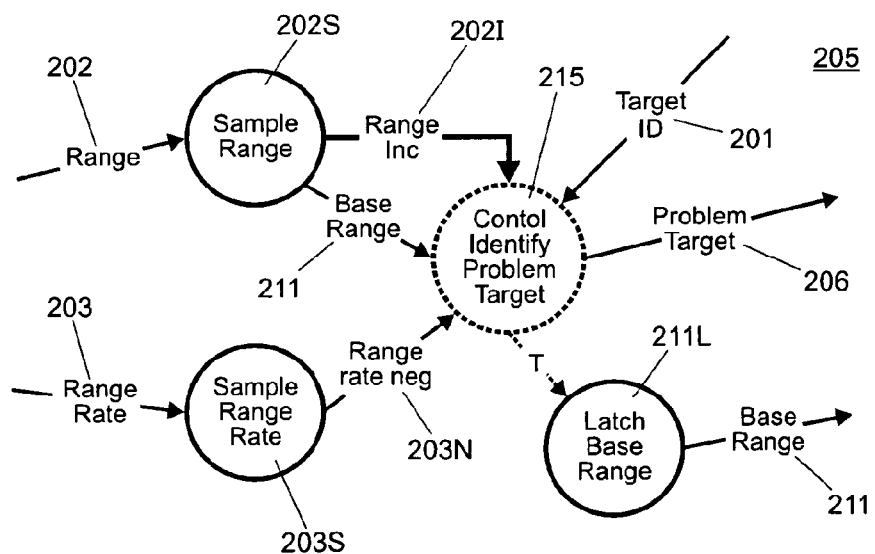
FIG. 4 illustrates the functionality of an Identify Problem Target function block of the control module.

The functionality of the Identify Problem Target function block 205 is illustrated in FIG. 4. It can be seen that the value of the parameter Range 202 is input to a function 'Sample Range' 202S arranged to sample successive values of the parameter Range 202. The Sample Range function 202S is arranged to determine whether the value of the parameter Range 202 has increased each time a value has been sampled for the n most recent values sampled.

If the value of the parameter Range 202 has increased each time, the Sample Range function 202S sets a flag 'Range Inc' 202I to a value of 1 indicating that the value of the parameter Range 202 has increased. If the value of the parameter Range 202 has not increased each time the Sample Range function 202S sets the flag Range Inc 202I to zero.

In the present embodiment n=3 although other values of n are also useful. For example in some embodiments n=1, whilst in some other embodiments n may be 2, 4, 5, 6 or any other integer value.

The value of the parameter Range rate 203 is input to a 'Sample Range Rate' function 203S arranged to sample successive values of the parameter Range rate 203. The Sample Range rate function 203S is arranged to determine whether the value of the parameter Range rate 203 has been negative each time a value has been sampled for the n most recent values sampled.

If the value of the parameter Range rate 203 has been negative each time, the Sample Range rate function 203S sets a flag 'Range rate negative' 203N to a value of 1. If the value of the parameter Range rate 203 has not been negative each time, the Sample Range rate function 203S sets the flag Range rate negative 203N to zero.

Thus it is to be understood that, for n=1, the flag Range Inc 202I is set to a value of 1 if the most recent value of the parameter Range 202 has increased since the previous value was sampled. The flag Range rate negative 203N is set to 1 if the most recently sampled value of Range rate 203 is negative.

In the case n=2, the flag Range Inc 202I is set to a value of 1 if the values of each of the two most recently sampled values of the parameter Range 202 represent an increase over their respective immediately preceding values. The flag Range rate negative 203N is set to 1 if the two most recently sampled values of Range rate 203 are negative.

Table 1 shows five successive values of the parameter Range 202 and Range rate 203 up to and including the most recently sampled values, sample number s.

TABLE 1

| Sample number | s − 4 | s − 3 | s − 2 | s − 1 | s | s + 1 | s + 2 |
|---|---|---|---|---|---|---|---|
| Range (m) | 5 | 5.2 | 5.1 | 5.6 | 5.8 | | |
| Range Rate (m/s) | −10.1 | −10.2 | −10.3 | −10.2 | −10.1 | | |

It is to be understood that for the case n=1, the flag Range Inc 202I is set to a value of 1 since the most recently sampled value of the parameter Range 202 (5.8 m, at time s) represents an increase over the immediately preceding value (5.6 m, at time s−1).

The flag Range rate negative 203N is also set to a value of 1 since the most recently sampled value of Range rate 203 is negative (−10.1 ms$^{-1}$ at time s).

For the case n=2, the flag Range Inc 202I is also set to a value of 1 because (1) the most recently sampled value of the parameter Range 202 (5.8 m at time s) represents an increase over the immediately preceding value (5.6 m at time s−1) and (2) the second most recently sampled value (5.6 m at time s−1) also represents an increase over its immediately preceding value (5.1 m at time s−2).

The flag Range rate negative 203I is set to a value of 1 since the two most recently sampled values of Range rate 203 are both negative (−10.2 ms$^{1}$ at time s−1 and −10.1 ms at time s).

For the case n=3, the flag Range Inc 202I is set to zero because the value of the parameter Range 202 at time s−2 (5.1 m) was less than the value at time s−3 (5.2 m). Thus the value of the parameter Range 202 decreased between time s−3 and time s−2 (by 0.1 m) and the conditions for Range Inc 202I to be set to a value of 1 are therefore not met.

The flag Range rate negative 203N is set to a value of 1 because the three most recently sampled values of Range rate 202 are each negative (−10.3 ms$^{-1}$, −10.2 ms$^{-1}$ and 10.1 ms$^{-1}$).

The Control Identify Problem Target function 215 compares the values of the flags Range Inc 202I and Range rate neg 203N. If the Range Inc flag 202I and the Range rate neg flag 203N are both set to a value of 1, the Control Identify Problem Target function 215 sets the Problem Target flag 206 to a value of 1.

In the event that the Problem Target flag 206 transitions from not set to set (i.e. from zero to 1), the Control Identify Problem Target function 215 latches the most recent value of the parameter Base Range 211 that is known to be a reliable (i.e. correct) value in a Latch Base Range latch 211L. The Latch Base Range latch 211L provides an output of the value of the Base Range parameter 211 latched therein. The latched value of the Base Range parameter 211 is used by the control module 133 as a 'last known correct value' of the parameter Range 202 from which corrected values of range are subsequently determined by a Compensate Range function block 210.

The last known correct value of Range 202 is taken to be the value sampled before the nth most recent value was sampled. Thus, in the example of Table 1, for n=1 the last known correct value would be that at time s−1, i.e. 5.6 m. For n=2 the last known correct value would be that at time s−2, i.e. 5.1 m. For n=3 the last known correct value would be that at time s−3, i.e. 5.2 m.

Figure 5:
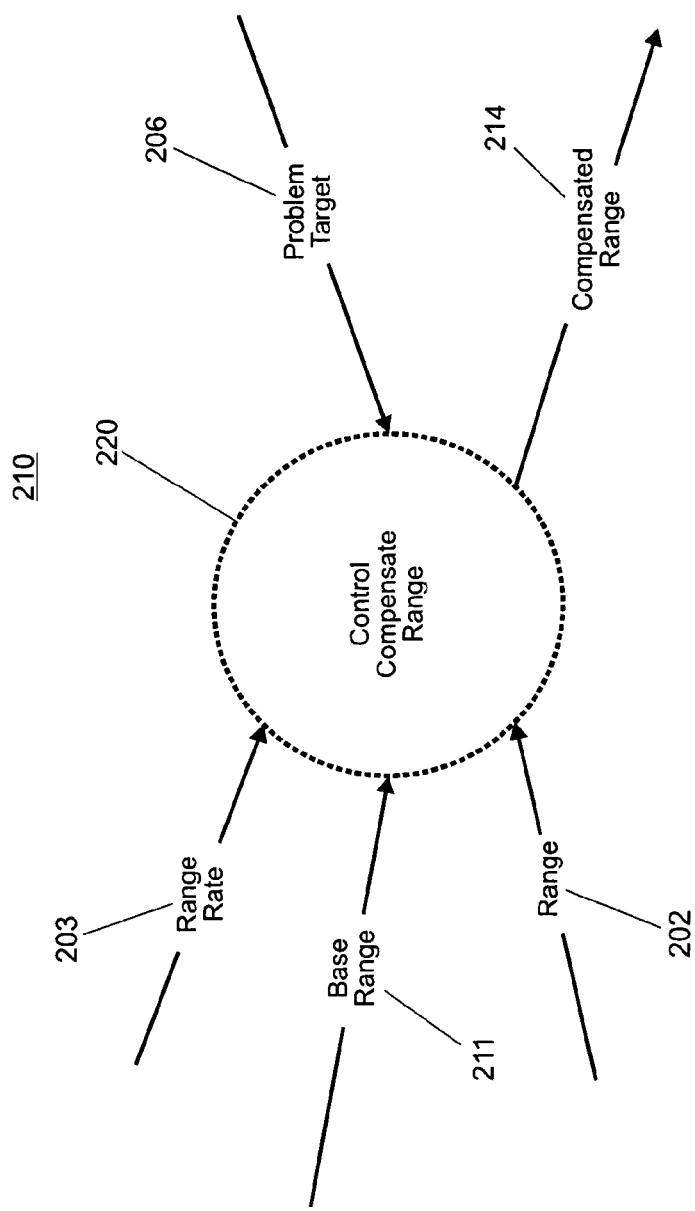
FIG. 5 illustrates the functionality of a Compensated Range function block of the control module.

The functionality of the Compensate Range function block 210 is illustrated schematically in FIG. 5. From FIG. 5 it can be seen that the latched value of Base Range 211 described above is input to a Control Compensate Range function 220 together with a value of each of the parameters Range 202 and Range rate 203 and the value of Problem Target flag 206.

The Control Compensate Range function 220 calculates a true value of the range of the apparatus 100 from the target 24 and outputs this value as a parameter Compensated Range 214. In the present embodiment the Control Compensate Range function 220 calculates the value of parameter Compensated Range 214 according to the formula:

$$\text{Compensated Range} = \text{Base Range} + (\text{Range rate} \times t)$$

where t is the time period between successive samples of the parameter Range rate 203. It is to be understood that the Control Compensate Range function 220 is arranged to add the current value of (Range rate 203×t) to the value of Base Range 211 each time an updated value of Range rate 203 is obtained (i.e. every t seconds). Thus, the Control Compensate Range function 220 is effectively arranged to integrate the value of Range rate over time and add this value to the value of Base Range 211.

Thus, it is to be understood that in some embodiments the Control Compensate Range function 220 calculates the value of the parameter Compensated Range 214 by integrating the value of the parameter Range Rate 203 in order to obtain a change in range over this period.

In this manner the Compensated Range 214 is calculated by integrating the value of the parameter Range Rate 203 over time and removing this from the Base Range 211.

In some alternative embodiments the Control Compensate Range function 220 initially calculates a parameter Offset Range by subtracting the value of the parameter Base Range 211 from the value of the parameter Range 202 when the Problem Target 206 flag is initially set. This is in order to obtain an 'offset value' of the new reflecting position from the previous reflecting position.

The value of parameter Offset Range is then subtracted from subsequent values of Range 202 whilst the reflected signal 113S is being reflected by the new reflecting position in order to obtain a value of the parameter Compensated Range 214. Thus the measured value of Range 202 is corrected to compensate for the offset in reflecting position that has occurred.

It is to be understood that other arrangements for determining a value of the parameter Compensated Range 214 may also be useful.

It is to be understood that the functionality of FIGS. 3 to 5 may be implemented in software, in firmware, in hardware or by a combination of two or more of these means as described above. It is further to be understood that the functionality of the detector module 131 and control module 133 may be implemented by a single module or by three or more modules. In some embodiments the functionality of the detector and control modules 131, 133 as described above is implemented substantially entirely in software, firmware, hardware or a combination thereof in association with required transmitter and detector hardware.

Figure 6:
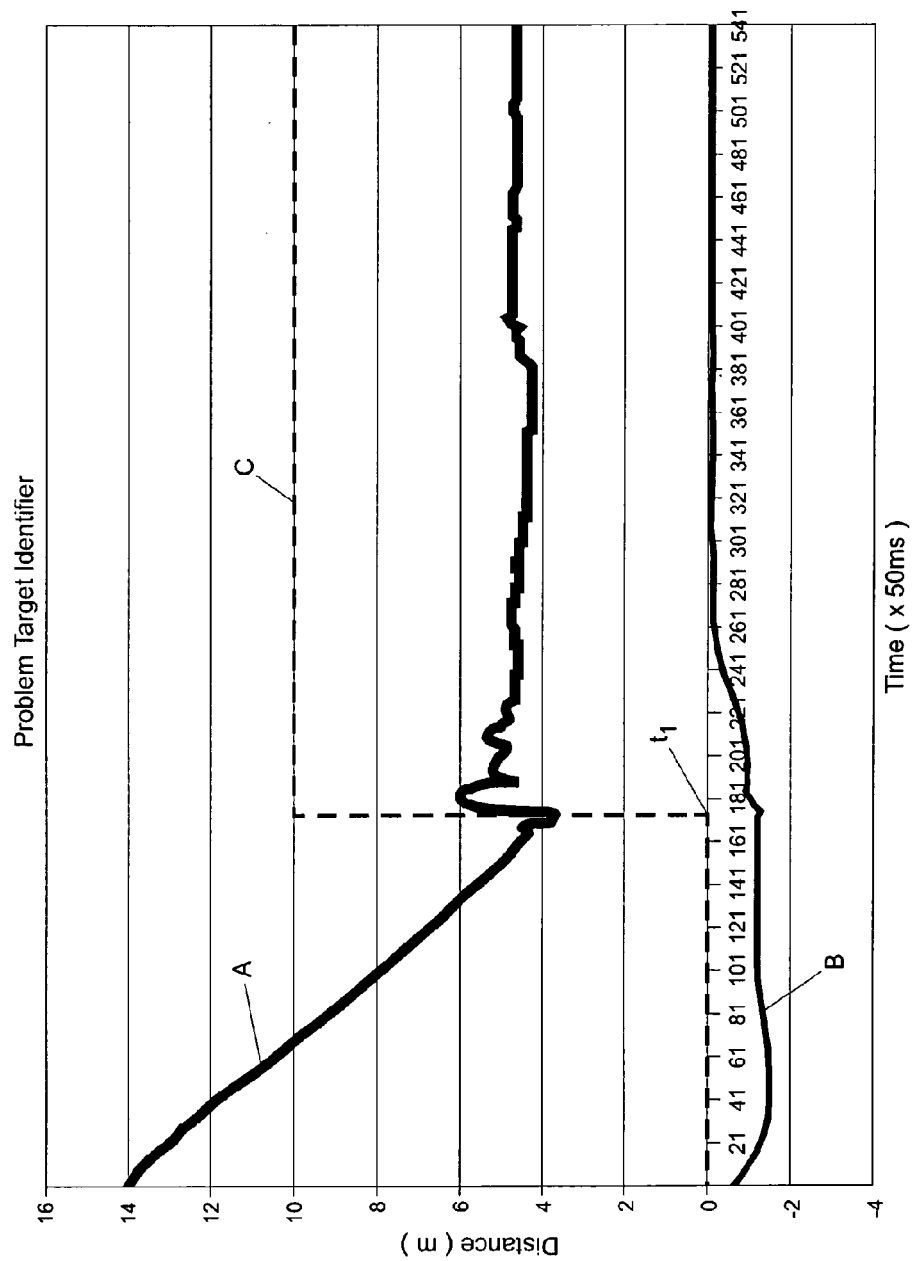
FIG. 6 is a plot of distance of a car from a particular target (a lorry) as a function of time as determined by reference to a time of flight of a radar signal travelling from the car to the lorry and back to the car (trace A); and rate of change of distance of the car from the lorry as a function of time as determined by measuring at the car a difference in frequency between the radar signal transmitted from the car and the radar signal reflected from the lorry back to the car (trace B)

FIG. 6 is a plot the values of the parameters Range 202 and Range rate 203 measured by apparatus 100 according to the embodiment of FIG. 2 as a function of time. In the time period shown the motor car 5 approaches a lorry 20. At time $t_1$ it can be seen that the value of parameter Range 202 (trace A) begins to increase whilst the value of parameter Range rate 203 remains negative (trace B). It can be seen that the value of the parameter Range 202 increases by over 2 m.

Figure 1:
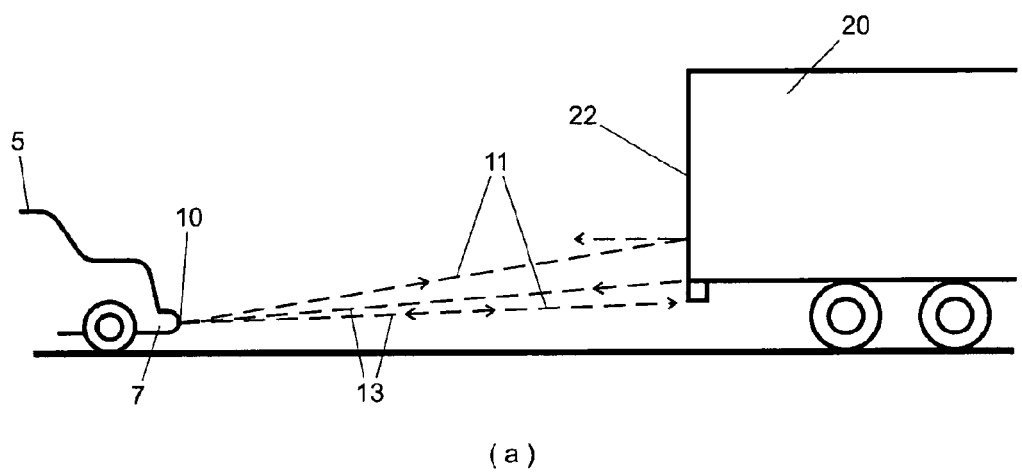
FIG. 1 is a schematic illustration of a trajectory of a beam of ultrasonic radiation transmitted from a motor car as the car approaches a lorry showing (a) reflection of the beam from a rear door of the lorry when the car is a relatively large distance from the lorry and (b) reflection of the beam from a rear axle of the lorry when the car is a relatively short distance from the lorry.
Figure 1:
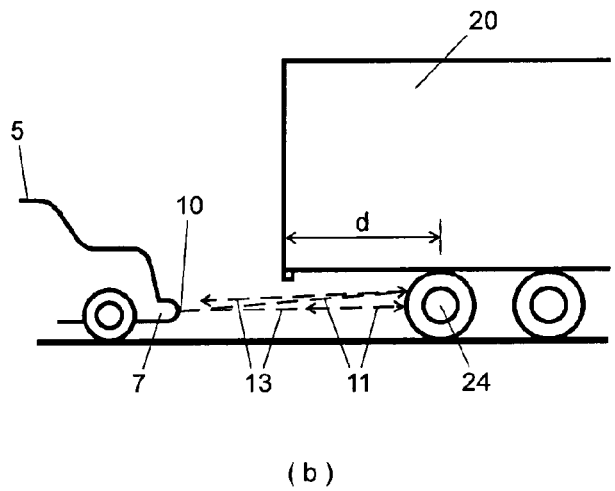

This increase in value of parameter Range 202 corresponds to the moment at which the signal 111S as detected by the receiver 113 begins to be reflected from the rear axle 24 of the lorry 20 and not the rear door 22 (see the scenarios of FIGS. 1(*a*) and 1(*b*)).

The value of Problem Target flag 206 is also plotted in FIG. 6 (trace C), shown multiplied by a factor of 10 for ease of inspection. It can be seen that the apparatus 100 detects that a problem target 24 exists at time $t_1$. This is because the value of the parameter Range 202 is increasing whilst the value of parameter Range rate 203 is negative.

It is to be understood that once the flag Problem Target 206 is set the apparatus 100 begins to calculate a value of the parameter Compensated Range 214.

Figure 7:
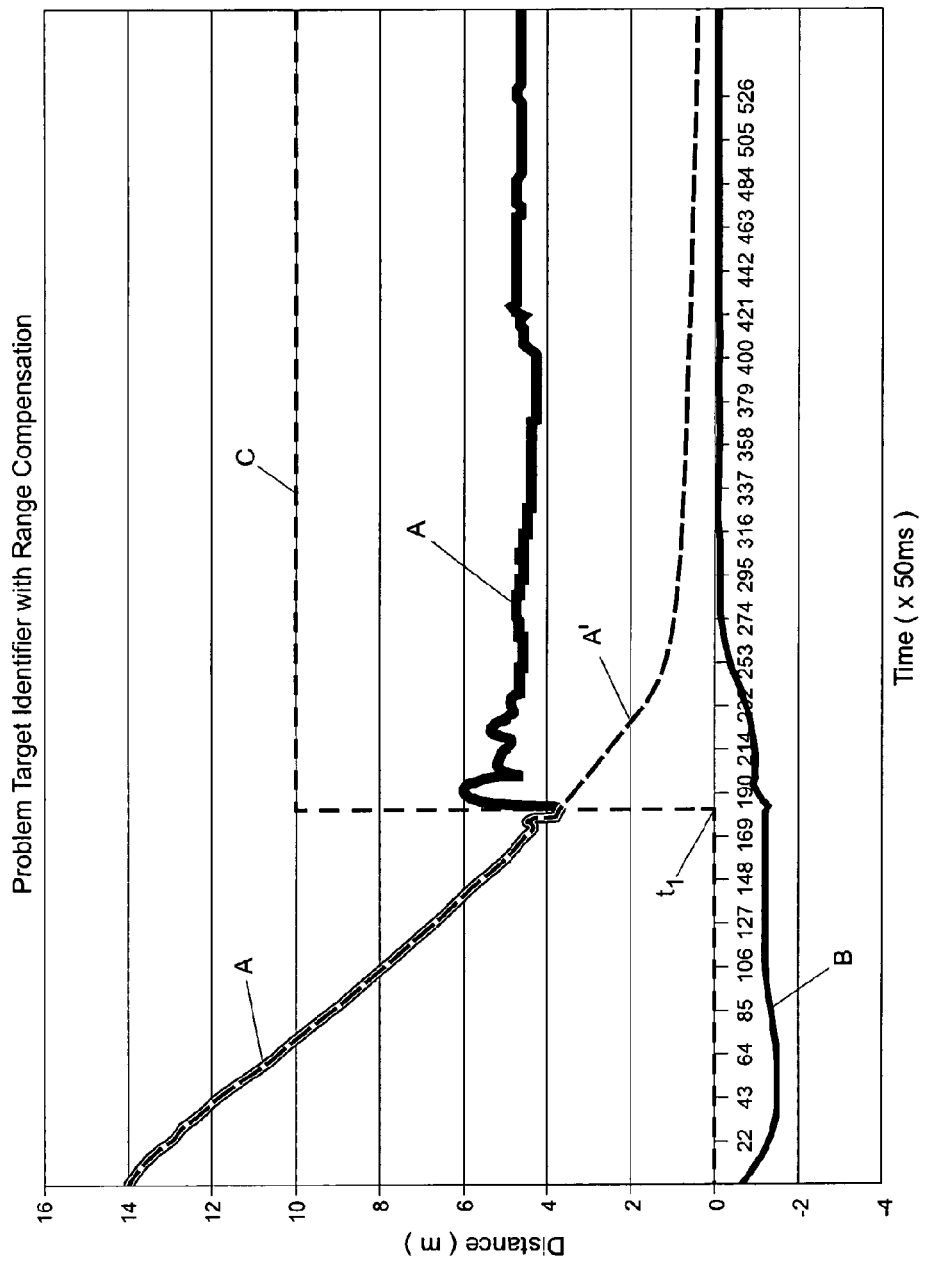
FIG. 7 shows the plot of FIG. 6 with a corrected value of range plotted thereon for a period during which the target was identified as a problem target.

FIG. 7 shows a plot of the value of each of parameters Range 202 (trace A), Range Rate 203 (trace B) and Compensated Range 214 (trace A'). It can be seen that, after time $t_1$, the value of parameter Compensated Range 214 is lower than that of parameter Range 202 by at least 3 m, providing an erroneous range determination that differs from actual range by up to a factor of at least 10 in the example shown.

It is to be understood that the ability to provide a correct value of range of a motor vehicle 5 from an object 24 represents a considerable safety advantage. This is because in a motor vehicle 5 having apparatus 100 according to an embodiment of the invention installed therein the apparatus 100 may be arranged automatically to activate a driver alert or active braking system in order to avert a collision. The driver alert may be provided through a driver interface 141 in the form of one or more of an audible alert, a visual alert, a physical alert (such as vibration of the driver's seat) or any other suitable alert.

Other arrangements are also useful. In some embodiments the apparatus 100 is configured to employ ultrasonic radiation instead of or in addition to electromagnetic radiation to measure range and rate of change of range from a target object. In some embodiments the apparatus is configured to employ non-ultrasonic sound waves such as sonic waves, sonar waves or any other suitable waveform. The apparatus may be employed in land-based vehicles, marine vessels, aircraft, spacecraft or any other suitable vehicles or objects.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An apparatus for detecting and correcting an erroneous measurement of a range of a target object from a subject object, the apparatus comprising:
   a transmitter configured to transmit a wireless signal having a first frequency from the subject object to the target object;
   a detector configured to detect a reflected portion of the signal reflected from the target object back toward the subject object; and
   a controller configured to:
      determine the range of the target object from the subject object by reference to a time of flight between transmitting the signal and detecting said reflected portion of the signal;
      determine a rate of change of the determined range by reference to a difference between the first frequency and an apparent frequency of the reflected portion of the signal;
      determine that an erroneous measurement of range has been made if the determined range increases while the determined rate of change of range is negative; and
      correct a value of range when an erroneous measurement of range has been made by (i) determining a correction factor from time and the determined rate of change of range and (ii) adjusting a recent reliable value of the determined range by the correction factor.

2. The apparatus of claim 1, wherein the controller is configured to correct the value of range based on an integral of values of the rate of change of range.

3. The apparatus of claim 2, wherein the controller is configured to correct a last known correct value of range by adding the integral of the values of the rate of change to the last known correct value of range.

4. The apparatus of claim 1, wherein the controller is configured to provide an indication that an erroneous measurement of range has been made only if the measured range of the target object represents an increase over a preceding measurement each time a measurement of range has been made for the previous n measurements where n is an integer greater than or equal to 1.

5. The apparatus of claim 4, wherein the preceding measurement is an immediately preceding measurement.

6. The apparatus of claim 4, wherein the controller is configured to provide an indication that an erroneous measurement of range has been made only if the rate of change of range of the target object has been negative each time a measurement of range has been made for the previous m measurements where m is an integer greater than or equal to 1.

7. The apparatus of claim 6, where m=n.

8. A method of detecting an erroneous measurement of a range of a target object from a subject object comprising:
   transmitting a signal having a first frequency from the subject object to the target object;
   detecting a portion of the signal reflected from the target object back toward the subject object;
   determining a range of the target object from the subject object by reference to a time of flight between the transmitting and the detecting; and
   determining a rate of change of the determined range by reference to a difference between the first frequency and an apparent frequency of the detected portion of the signal;
   providing an indication that an erroneous measurement of range has been made if the determined range increases while the determined rate of change of range is negative; and
   providing a corrected value of range when an erroneous measurement of range has been made by determining a correction factor from time and the determined rate of change of range and adjusting a recent reliable value of the determined range by the correction factor.

9. The method of claim 8, wherein the step of providing the corrected value of range comprises correcting the value of range based on an integral of values of the determined rate of change of range.

10. The method of claim 9, wherein the step of providing the corrected value of range comprises correcting a last known correct value of range by adding the integral of the values of the rate of change of range to the last known correct value of range.

11. The method of claim 8, wherein the step of providing the indication that an erroneous determination of range has been made comprises providing said indication if the measured range of the target object represents an increase over a preceding measurement each time a measurement of range has been made for the previous n measurements where n is an integer greater than or equal to 1 while the determined rate of change of range is negative and wherein the preceding measurement is an immediately preceding measurement.

12. The method of claim 11, wherein the step of providing an indication that an erroneous determination of range has been made comprises providing said indication if the rate of change of range of the target object has been negative each time a measurement of range has been made for the previous m measurements where m is an integer greater than or equal to 1.

13. The method of claim 12, wherein m=n.

14. A motor vehicle, comprising:
   a transmitter configured to transmit a wireless signal having a first frequency from the vehicle to the target object;
   a detector configured to detect a reflected portion of the signal reflected from the target object back toward the vehicle; and
   a controller configured to:
      determine the range of the target object from the vehicle by reference to a time of flight between transmitting the signal and detecting the reflected portion of the signal;
      determine a rate of change of the determined range by reference to a difference between the first frequency and an apparent frequency of the reflected portion of the signal;
      determine that an erroneous measurement of range has been made if the determined range increases while the determined rate of change of range is negative; and
      correct a value of range when an erroneous measurement of range has been made by determining a correction factor from time and the determined rate of change of range and adjusting a recent reliable value of the determined range by the correction factor.

15. The motor vehicle of claim 14, wherein the controller is configured to trigger at least one of an audible alert, a visual alert, a physical alert and an application of a brake when the range of the target object from the vehicle falls below a prescribed threshold.

16. An apparatus for detecting and correcting an erroneous measurement of a range of a target object from a subject object comprising:
 wireless transmission means for transmitting a signal having a first frequency from the subject object to the target object;
 detector means for detecting a reflected portion of the signal reflected from the target object back toward the subject object;
 range determination means for determining the range of the target object from the subject object by reference to a time of flight of said portion of the signal from the transmission means to the detector means;
 rate determination means for determining a rate of change of the range by reference to a difference between the first frequency and an apparent frequency of the reflected portion of the signal detected by the detector means; and
 a controller configured to provide an indication that an erroneous measurement of range has been made if the range determined by the range determination means increases while the rate of change of range determined by the rate determination means is negative;
 the controller being configured to correct the value of range determined by the range determination means when an erroneous measurement of range is indicated, the controller correcting the value of range by determining a correction factor from time and the rate of change of range determined by the rate determination means and adjusting a recent reliable value of the range determined by the range determination means by the correction factor.

17. The apparatus of claim 16, wherein the controller is configured to correct the value of range based on an integral of values of the rate of change of range determined by the rate determination means.

18. The apparatus of claim 17, wherein the controller is configured to correct a last known correct value of range by adding the integral of the values of the rate of change to the last known correct value of range.

19. The apparatus of claim 16, wherein the controller is configured to provide an indication that an erroneous determination of range has been made only if the range determination means determines that the measured range of the target object represents an increase over a preceding measurement each time a measurement of range has been made for the previous n measurements where n is an integer greater than or equal to 1.

20. The apparatus of claim 19, wherein the controller is configured to provide an indication that an erroneous determination of range has been made only if the further requirement is met that the rate determination means determines that the rate of change of range of the target object has been negative each time a measurement of range has been made for the previous m measurements where m is an integer greater than or equal to 1.

21. The apparatus of claim 20, wherein m=n.

* * * * *

UNITED STATES PATENT AND TRADEMARK OFFICE
CERTIFICATE OF CORRECTION

PATENT NO. : 9,684,072 B2
APPLICATION NO. : 13/823262
DATED : June 20, 2017
INVENTOR(S) : Paul Widdowson and Mark Cund Page 1 of 1

It is certified that error appears in the above-identified patent and that said Letters Patent is hereby corrected as shown below:

In the Claims

In Claim 14, Column 12, Line 45; replace "the target" with --a target--

In Claim 14, Column 12, Line 54; replace "the range of the target object" with --a range of the target object--

Signed and Sealed this
Twentieth Day of November, 2018

Andrei Iancu
*Director of the United States Patent and Trademark Office*